United States Patent [19]

Rossetti et al.

[11] Patent Number: 5,713,438
[45] Date of Patent: Feb. 3, 1998

[54] METHOD AND APPARATUS FOR NON-MODEL BASED DECENTRALIZED ADAPTIVE FEEDFORWARD ACTIVE VIBRATION CONTROL

[75] Inventors: Dino J. Rossetti, Raleigh; Mark R. Jolly, Holly Springs; Mark A. Norris, Apex, all of N.C.

[73] Assignee: Lord Corporation, Cary, N.C.

[21] Appl. No.: 622,540

[22] Filed: Mar. 25, 1996

[51] Int. Cl.$^6$ ........................................ F16F 7/10
[52] U.S. Cl. ...................... 188/378; 267/140.14; 381/71
[58] Field of Search ........................ 188/378, 379, 188/380; 267/136, 140.14; 248/550; 381/71; 244/54, 17.27; 364/574

[56] References Cited

U.S. PATENT DOCUMENTS

| | | | |
|---|---|---|---|
| 3,085,657 | 4/1963 | Preis | 188/1 |
| 3,430,902 | 3/1969 | Lohr | 248/18 |
| 3,490,556 | 1/1970 | Bennett, Jr. et al. | 188/33 |
| 3,566,993 | 3/1971 | Leatherwood et al. | 188/1 |
| 3,606,233 | 9/1971 | Scharton et al. | 248/358 |
| 3,668,939 | 6/1972 | Schrader | 74/61 |
| 3,685,610 | 8/1972 | Bschorr | 181/33 L |
| 3,836,098 | 9/1974 | Miyashita | 244/17.27 |
| 3,917,246 | 11/1975 | Gartner et al. | 267/136 |
| 4,083,433 | 4/1978 | Geohegan, Jr. et al. | |
| 4,111,386 | 9/1978 | Kenigsberg et al. | 244/17.27 |
| 4,531,699 | 7/1985 | Pinson | 248/550 |
| 4,694,650 | 9/1987 | Vincent | 60/520 |
| 4,715,559 | 12/1987 | Fuller | 244/1 N |
| 4,724,923 | 2/1988 | Waterman | 181/208 |
| 4,795,123 | 1/1989 | Forward et al. | 248/550 |
| 4,796,873 | 1/1989 | Schubert | 267/136 |
| 4,821,205 | 4/1989 | Schutten et al. | 364/508 |
| 5,124,938 | 6/1992 | Algrain | 364/566 |
| 5,133,527 | 7/1992 | Chen et al. | 248/550 |
| 5,170,433 | 12/1992 | Elliott et al. | 381/47 |
| 5,209,326 | 5/1993 | Harper | 188/378 |

(List continued on next page.)

FOREIGN PATENT DOCUMENTS 2 122 052 A   6/1982   United Kingdom .

OTHER PUBLICATIONS

SAE Technical Paper Series, No. 830736; E. H. Waterman, D. Kaptein, and S.L. Sarin; "Fokker's Activities in Cabin Noise Control for Propeller Aircraft "1983.

Feintuch, "A Frequency Domain Model for Filtered LMS Algorithms...", IEEE, 1993, pp. 1518–1531.

Southward, "Centralized vs Decentralized: Optimal Steady–State Tonal Control for Multichannel Systems ", 1992.

Primary Examiner—Robert J. Oberleitner
Assistant Examiner—Pamela J. Lipka
Attorney, Agent, or Firm—Randall S. Wayland; James W. Wright

[57] ABSTRACT

A method and system/apparatus implementing a non-model based Decentralized Feedforward Adaptive Algorithm (DFAA) for active vibration control of an actively-driven element, such as an Active Vibration Absorber (AVA) (24). The AVA (24) preferably includes an inertial tuning mass (42) and a voice coil assembly (46) and is contained in an active vibration control system (20) wherein the method and system/apparatus reduce vibration of a vibrating member (22) at an attachment point (26) by receiving an error signal from an error sensor (28) such as an accelerometer and a reference signal from a tachometer (32) or accelerometer (34), where the reference signal is correlated to, or indicative of the frequency content of, a primary vibration source (36) and calculating an updated output signal via an electronic controller (39) using the non-model based DFAA to dynamically drive the actively-driven element, such as AVA (24). The method and system/apparatus using DFAA is effective for reduction of both tonal and broadband vibration. The method approaches the performance of Filtered-x LMS control, yet is decentralized and does not require information regarding the plant.

20 Claims, 3 Drawing Sheets

U.S. PATENT DOCUMENTS

| | | | |
|---|---|---|---|
| 5,251,863 | 10/1993 | Gossman et al. | 248/550 |
| 5,255,764 | 10/1993 | Kurabayashi et al. | 188/380 |
| 5,310,137 | 5/1994 | Yoerkie, Jr. et al. | 244/17.27 |
| 5,327,061 | 7/1994 | Gullapalli | 318/649 |
| 5,332,061 | 7/1994 | Majeed et al. | 180/312 |
| 5,333,819 | 8/1994 | Stetson, Jr. | 188/378 X |
| 5,361,878 | 11/1994 | Borsati | 188/378 |
| 5,418,858 | 5/1995 | Shoureshi | 381/71 |
| 5,427,347 | 6/1995 | Swanson et al. | 248/550 |
| 5,427,362 | 6/1995 | Schilling et al. | 267/140.14 |
| 5,439,082 | 8/1995 | McKeown et al. | 188/379 |
| 5,526,292 | 6/1996 | Hodgson et al. | 364/574 |
| 5,551,650 | 9/1996 | Southward et al. | 244/54 |

METHOD AND APPARATUS FOR NON-MODEL BASED DECENTRALIZED ADAPTIVE FEEDFORWARD ACTIVE VIBRATION CONTROL

FIELD OF THE INVENTION

This invention relates to the area of methods and systems/apparatus for controlling dynamic vibrations of a vibrating member. Specifically, it relates to real-time active control methods and systems/apparatus for controlling vibration of a vibrating member.

BACKGROUND OF THE INVENTION

Passive Tuned Vibration Absorbers (TVAs) are generally known. Basically, they include a suspended inertial tuning mass which is tuned, in conjunction with the flexible element (spring) attached thereto, to exhibit a resonant natural frequency (fn), and thus possesses a very high mechanical impedance, which generally reduces vibration of a vibrating member at the point of attachment thereto. The disadvantage of passive TVAs is they are only effective at the particular tuned frequency (fn) or within a narrow range thereabouts and they may increase vibration at other frequencies.

Although, in some applications, TVAs provide adequate vibration reduction, in other applications, where the disturbance of the vibrating member varies widely in frequency, or where a very large (heavy) device is required, a passive TVA may be unacceptable. U.S. Pat. No. 3,490,556 to Bennett, Jr. et al. entitled: "Aircraft Noise Reduction System With Tuned Vibration Absorbers" and U.S. Pat. No. 3,668,939 to Schrader entitled: Plane Omnidirectional Absorber" describe passive TVAs for reducing vibration and/or noise. SAE paper 83076 entitled: "Fokker's Activities in Cabin Noise Control for Propeller Aircraft" by E. H. Waterman, D. Kaptien, and S. L. Sarin describes 4P passive TVAs which are attached to the fuselage stiffening rib of an aircraft.

Where a wider range of vibration cancellation is required, various adjustable, adaptive, or multi-frequency TVAs may be employed. For example, U.S. Pat. No. 5,361,878 to Borsati entitled: "Dynamic Two Frequency Vibration Damper" describes a TVA which can be tuned to passively cancel vibrations at two different frequencies. U.S. Pat. No. 3,085,657 to Preis entitled: "Variable Frequency Vibration Absorber" describes a TVA where the position of the mass 14 on spring 10 can be passively adjusted to change the TVAs natural frequency. U.S. Pat. No. 3,430,902 to Lohr entitled: "Variable Stiffness Polymeric Damper" teaches a TVA whose resonant frequency is adaptively varied by controlling temperature of a polymeric spring element 16 which has temperature-dependent stiffness characteristics.

Active Vibration Absorbers (AVAs), otherwise referred to as active inertial actuators or active proof mass devices, include an active driving element which drives an inertial tuning mass through a wide range of frequencies. U.S. Pat. Nos. 5,427,362, 4,795,123, 4,694,650, 4,083,433 and 3,917,246 describe various AVAs. U.S. Pat. Nos. 5,332,061, 5,310,137, 5,251,863, and 4,715,559 describe various systems where AVAs are useful. In particular, it is known to use AVAs to cancel engine vibration in automobiles, to attach AVAs inside the fuselage of an aircraft to cancel noise therein, to use AVAs to cancel high-frequency vibrations of a helicopter transmission, and to use AVAs to cancel vibrations of machinery.

Generally, it is also known to use feedback control methods for vibration or noise control. In general, design of a feedback vibration control system will require an accurate model of plant dynamics and will be centralized in nature, where each actuator is a function of all sensors (and possibly all actuators). Such systems can be simplified when the actuators and sensors are collocated. This allows feedback control laws to be defined without models of the plant dynamics and to be decentralized, i.e., each actuator signal is based solely upon the signal of the sensor collocated therewith. U.S. Pat. No. 5,310,137 to Yoerkie et al. entitled: "Helicopter Active Noise Control System" describes an active noise control system including inertial actuators, collinear sensors and decentralized feedback control. U.S. Pat. Nos. 5,327,061 to Gullapalli, 5,255,764 to Kurabayashi et al., 5,124,938 to Algrain, 4,531,699 to Pinson, 4,083,433 to Geohegan et al., and 3,606,233 to Scharton et al. describe feedback control of vibration in other apparatus.

For feedback control, reducing vibration to low levels will require large feedback gains. Further, there are significant instability problems to overcome with feedback control methods. Centralized Feedforward control systems are generally known to overcome these limitations. In the centralized case, fully-coupled systems still require information on plant dynamics and on actuator/sensors pairs when implementing gradient-based descent algorithms, such as Least Mean Square (LMS) or Filtered-x LMS algorithms. The Filtered-x algorithm is fully described in the textbook "Adaptive Signal Processing" by B. Widrow and S. D. Stearn, 1985, Prentice-Hall, Inc., Englewood Cliffs, N.J. 07632. Necessarily, fully-coupled Feedforward systems require significant microprocessing power to perform the vast number of calculations/manipulations required for adaptive centralized control. For example, the Filtered-x LMS algorithm for tonal control utilizes an update equation of the form:

$$u(k+1)=u(k)+\mu \hat{C}^H e(k). \qquad (1)$$

The complex transfer function matrix $\hat{C}$, in the fully-coupled case, is a fully populated matrix. The superscript $^H$ denotes the complex conjugate of the transposed matrix. The complex transfer function matrix represents a model of the actual frequency response between the actuators and sensors contained in the system (which necessarily depends on the structural vibration dynamics). Manipulations required to develop the complex transfer function matrix $\hat{C}$ are detailed and numerous, especially for large dimensional systems.

Therefore, there is a recognized need for a system/apparatus and method to provide decentralized active vibration control, yet which is simple, requires no information about the plant, and overcomes the instability problems associated with prior art feedback systems.

SUMMARY OF THE INVENTION

Therefore, in light of the advantages and drawbacks of the prior art, the present invention is a method and apparatus for controlling dynamic vibration of a vibrating member using a non-model based Decentralized Feedforward Adaptive Algorithm (DFAA) that does not require a model of the plant of the system and that avoids the instability problems associated with control of active systems using "prior art" feedback techniques.

The invention is comprised of a system/apparatus and associated control method for actively controlling vibration, such as in an active vibration control system, which attaches to, and controls dynamic vibration of, a vibrating member at a primary tonal operating frequency or at multiple tonal frequencies or harmonics of the primary frequency, hereinafter referred to as "tonal" control or within a broad frequency range, hereinafter referred to as "broadband" control.

The present invention system/apparatus is comprised of an actively-driven element, preferably an Active Vibration Absorber (AVA), for attachment to an attachment point on a vibrating member, a substantially collocated error sensor, such as an accelerometer, for providing an error signal indicative of the residual dynamic vibration at a point substantially adjacent to the attachment point, a reference sensor, such as from a tachometer or accelerometer, for providing a reference signal which is correlated to, or indicative of the frequency content of, the primary vibration source, i.e., the disturbance which is causing dynamic vibration to be generated at the attachment point on the vibrating member, and an electronic controller, preferably digital, for adaptively calculating an updated output signal which is derived from the reference signal and said error signal based upon a non-model based DFAA, and providing the updated output signal to the actively-driven element (e.g. an AVA) thereby causing dynamic vibration at said attachment point on the vibrating member to be reduced (and preferably driven to zero).

It is an advantage of the present invention that vibration levels may be reduced to zero with a lessened chance of instability as compared to prior art feedback systems.

It is an advantage of the present invention that the number and complexity of calculations/manipulations needed to update and adapt the output (cancellation) signal is reduced as compared to a fully-coupled feedforward control system.

It is an advantage of the present invention that a model including the structural vibration dynamics is not required, thus eliminating the need for a system identification step, i.e., the method of control of the system/apparatus is non-model based.

It is an advantage of the present invention that global vibration control of a large-scale system can be accomplished by using multiple-actively-driven elements which utilize a common reference signal, yet implement a simple non-model based decentralized feedforward control.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE INVENTION

Figure 1:
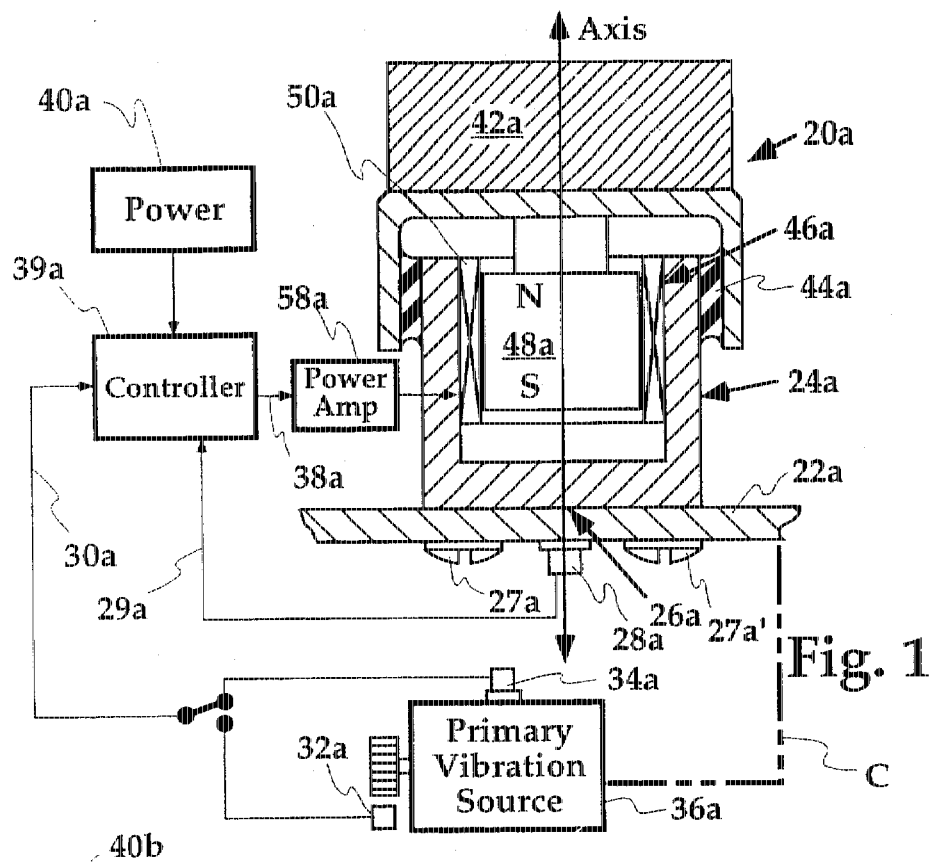
FIG. 1 is a partially cross-sectioned side view of the present invention including apparatus with collocated sensor and actively-driven element controlled by a Decentralized Feedforward Adaptive Algorithm (DFAA)

Referring now to the Drawings where like numerals denote like elements, in FIG. 1, shown generally at 20a, is a first embodiment of the present invention system/apparatus controlled by a non-model based DFAA. The apparatus is an active vibration control system 20a for attachment to, and controlling dynamic vibration of, a vibrating member 22a, such as a vibrating aircraft fuselage or automobile structure. Vibration control can be implemented in either a "broadband" or "tonal" fashion. The system 20a comprises at least one actively-driven element, which is preferably of the inertial-type, such as the at least one Active Vibration Absorber (AVA) 24a shown, for attachment at, and connection to, an attachment point 26a on the vibrating member 22a. The connection is preferably by fasteners, 27a and 27a', or the like.

The invention further comprises a substantially-collocated error sensor, such as accelerometer 28a shown, for providing an error signal (e.g. acceleration) via error cable 29a which is indicative of residual vibration at a point substantially adjacent to the attachment point 26a, a reference sensor, such as the tachometer 32a or accelerometer 34a shown, for providing a reference signal, via reference cable 30a, which is correlated to, or indicative of the frequency (fc) content of, a primary vibration source 36a which causes the dynamic vibration to be generated at the attachment point 26a, and an electronic controller 39a, which is preferably digital, for adaptively calculating an updated output signal, which is derived from said reference signal and said error signal based upon a non-model based Decentralized Feedforward Adaptive Algorithm (DFAA).

The updated output signal is then provided to said at least one actively-driven element, such as an AVA 24a, via output cable 38a, thereby producing active dynamic forces for causing residual dynamic vibration at the attachment point 26a to be controlled, and preferably reduced to zero. The primary vibration source 36a may be an aircraft engine, an automobile engine or other like power device which exhibits a rotating unbalance or the like which causes dynamic vibration of the structural member attached thereto. The vibratory interconnection to the vibrating member 22a is illustrated by double-dotted line C.

The DFAA is non-model based, as it requires no information on the system plant. Further, the DFAA has both "tonal" and "broadband" implementations, the output of which is calculated according to Equation 2 and Equation 3 below (to be fully described later herein).

$$u(k+1) = \alpha \, u(k) - \mu \, b \, e(k); \quad \quad (2) \text{ (Tonal)}$$

and $$W(k+1) = \alpha \, W(k) - \mu \, e(k) Z(k). \quad \quad (3) \text{ (Broadband)}$$

A power source 40a is provided for providing power to reference sensor(s), 32a or 34a, collocated error sensor 28a, electronic controller 39a, and an actively-driven element, such as AVA 24a. The AVA 24a is preferably comprised of an inertial tuning mass 42a, preferably manufactured from a high density material such as steel or tungsten, a flexible element 44a, such as the elastomeric tube form section shown, for flexibly interconnecting said inertial tuning mass 42a to said vibrating member 22a at the attachment point 26a, and means for actively driving said inertial tuning mass 42a, such as the voice coil assembly 46a shown. The active driving takes place at the proper phase and amplitude to effectively cancel or minimize vibration at the attachment point 26a.

Voice coil assembly 46a is preferably comprised of a permanent magnet 48a of sufficient strength and a wound coil 50a of copper wire. Providing alternating electrical current i through wound coil 50a via output cable 38a generates a dynamically oscillating magnetic field H about wound coil 50a. This dynamically generated magnetic field H interacts with the North (N) and South (S) poles on permanent magnet 48a and, thus, dynamically drives the inertial tuning mass 42a at the frequency of the output signal.

Figure 2:
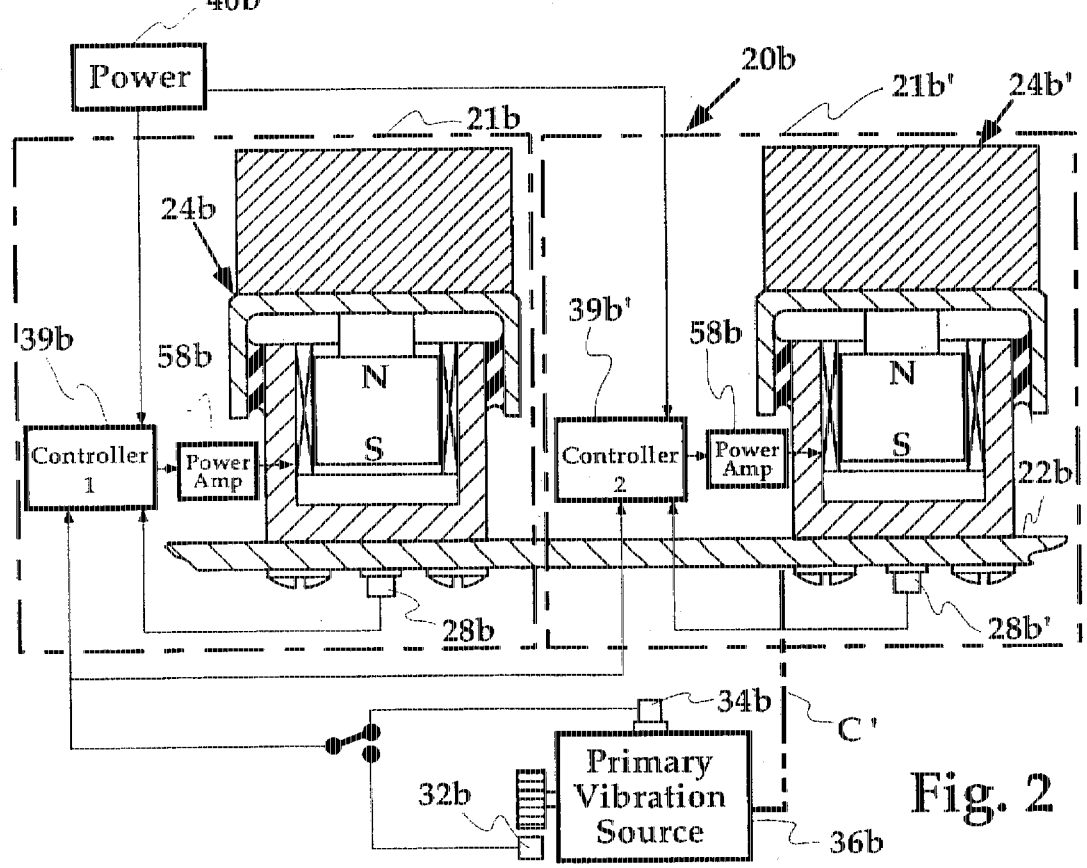
FIG. 2 is a partially cross-sectioned side view of the present invention in a system including decentralized control of more than one actively-driven element.

FIG. 2, shown generally at 20b, illustrates the present invention system/apparatus where there are a plurality of actively-driven elements, such as multiple AVAs, 24b and 24b', which are each decentrally controlled via a non-model based DFAA, yet the output of each AVA, 24b and 24b', is correlated to a common reference signal from a reference sensor, such as the common tachometer 32b or accelerometer 34b shown. The AVAs, 24b and 24b', are identical to the AVA described in the FIG. 1 embodiment, except each actively-driven element (AVA), 24b and 24b', has an independent controller, such as controller 1 39b and controller 2 39b' for determining the updated output signal to be provided to each actively-driven element. It should be understood that the non-model based DFAA is implemented in a decentralized fashion within controller 1 39b independent of what calculations/manipulations are taking place within controller 2 39b'. The AVA 24b associated with controller 1 39b does not require any information on the AVA 24b' or collocated error sensor 28b' controlled by controller 2 39b', and vice versa. Furthermore, the system 20b implementing the non-model based DFAA does not require any information on the plant.

Each subsystem, 21b and 21b', comprises an actively-driven element, such as AVAs, 24b and 24b', a collocated error sensor, 28b and 28b', a reference sensor input correlated to, and/or indicative of, the frequency content of the primary vibration source 36b from a common reference sensor, 32b or 34b, and an independent decentralized controller, 39b and 39b', which may be powered by a common power source 40b. It should be understood that more than one subsystem 21b, 21b' may be required to properly control the various modes of the vibrating member 22b. Double-dotted line C' indicates a vibration transmitting interconnection between the primary vibration source 36b and the vibrating member 22b. It should also be understood that the system controlled by the non-model based DFAA does not require information on the plant, as do the prior art centralized fully-coupled systems. Therefore, the system and controller complexity is significantly reduced.

Figure 3:
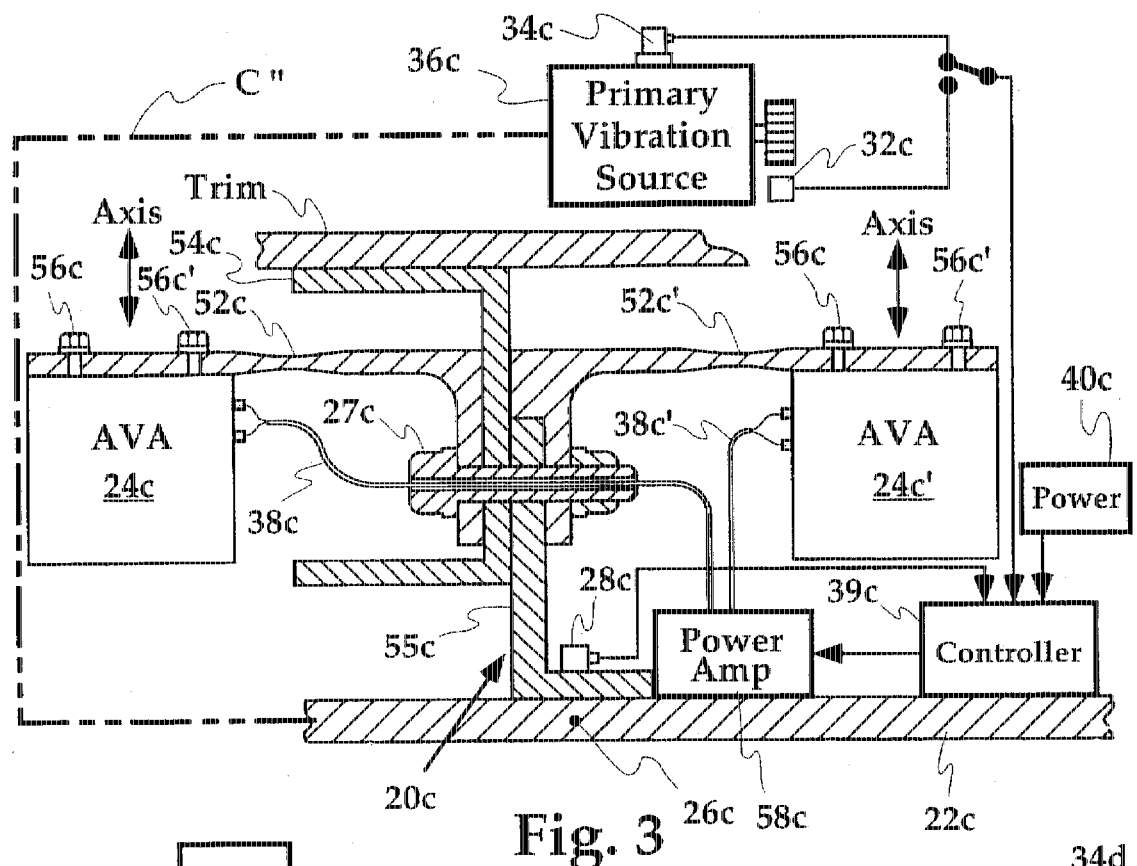
FIG. 3 is a partially cross-sectioned side view of another embodiment of the present invention including multiple AVAs attached at the attachment point.

FIG. 3 illustrates another embodiment of the active vibration control systems/apparatus employing a non-model based DFAA shown attached to an aircraft stiffening rib 55c for controlling dynamic vibrations of a member 22c, such as an aircraft fuselage, to reduce cabin noise and/or vibration within the interior of the aircraft. The system 20c is comprised of a decentralized electronic controller 39c for implementing the adaptive calculations associated with the non-model based DFAA, a power source 40c, a power amp 58c, multiple AVAs, 24c and 24c', attached at the attachment point 26c, a collocated error sensor such as accelerometer 28c shown, and a reference signal from a reference sensor, such as the accelerometer 34c or tachometer 32c which is correlated to, and indicative of the frequency content of the primary vibration source 36c. The vibration of vibrating member 22c (aircraft fuselage) may be due to vibration source 36c or indirectly from propeller wash impinging on the fuselage from propeller rotation. The double-dotted line C" is indicative of a vibrational interconnection between the primary vibration source 36c and the vibrating member 22c, regardless of whether that interconnection be structural or aerodynamic.

The vibrating member 22c (fuselage) has a stiffening rib 55c attached thereto with a fuselage frame 54c attached thereon. The AVAs, 24c and 24c', are preferably attached to stiffening rib 55c and/or the fuselage frame 54c by fastener 27c. Secondary springs, 52c and 52c', flexibly interconnect the AVAs, 24c and 24c', to the vibrating member 22c (fuselage). AVAs, 24c and 24c', attach to secondary springs, 52c and 52c', at the ends thereof by way of bolts, 56c and 56c'. It should be understood that AVAs, 24c and 24c', each have an inertial mass and flexible member located therein. Therefore, there are multiple resonances (fn1 and fn2) associated with each flexibly-suspended AVA, 24c and 24c', because there are multiple springs and masses associated therewith. Preferably, AVAs, 24c and 24c', would be tuned identically and secondary springs, 52c and 52c', would be of identical stiffness. Therefore, each half of the system 20c would exhibit the same two resonant frequencies (fn1 and fn2). By way of example, and not by limitation, one frequency (fn1) of each flexibly suspended AVA could be tuned near the primary disturbance frequency and the other (fn2) near its first harmonic. The AVAs, 24c and 24c', would preferably be electrically wired together via output cables, 38c and 38c', such that they receive the same updated output signal and are dynamically driven together.

Figure 4:
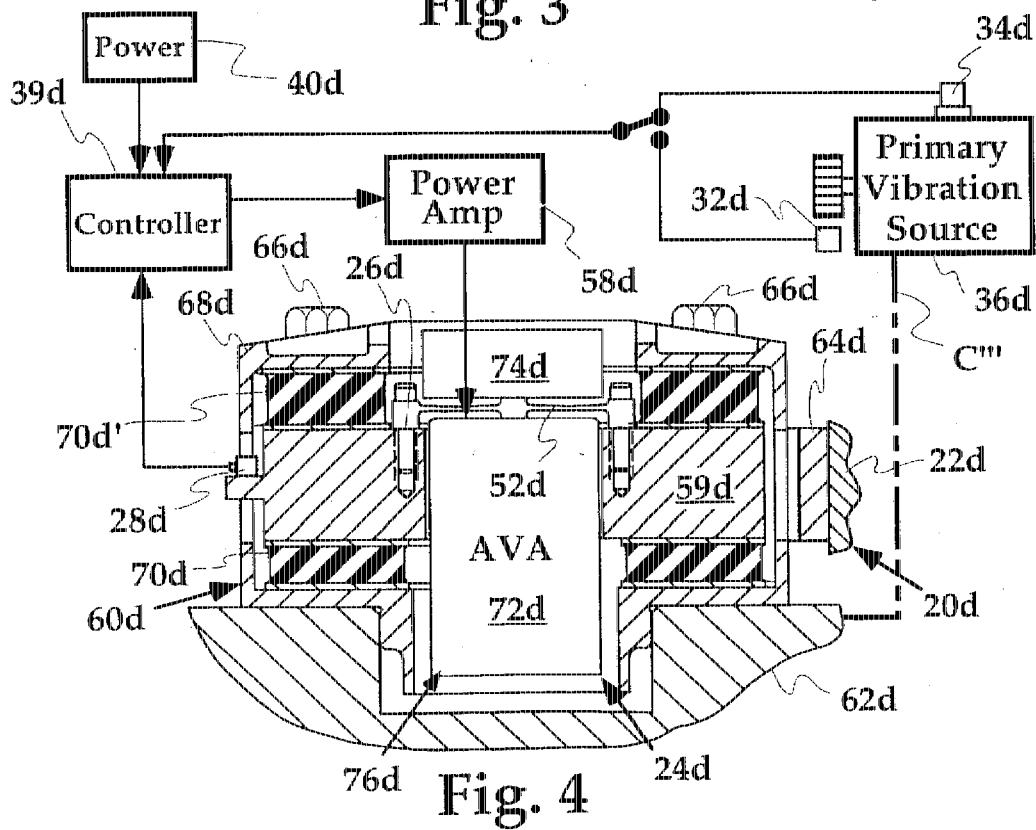
FIG. 4 is a partially cross-sectioned side view of another embodiment of the present invention installed in combination with an engine mount.

FIG. 4 illustrates yet another embodiment of system 20d employing a non-model based DFAA shown attached to an inner member 59d of an engine mount 60d for controlling dynamic vibrations of a member 22d (e.g. structure) which is attached to the inner member 59d and caused by a primary vibration source 36d (e.g. engine) attached to engine mount 60d at engine part 62d via bolts 66d. Double dotted line C''' indicates a structural and preferably substantially rigid connection between vibration source 36d and engine part 62d.

The system 20d is comprised of a decentralized electronic controller 39d for implementing the adaptive calculations associated with the non-model based DFAA, a power source 40d, a power amp 58d, AVA 24d attached at the attachment point 26d on inner member 59d, a collocated error sensor 28d, and a reference signal from a reference sensor, such as accelerometer 34d or tachometer 32d which is correlated to, or indicative of the frequency content of, the primary vibration source 36d.

The engine mount 60d is comprised of a box-like outer member 68d, an inner member 59d which attaches to member 22d by clevis 64d, and multiple-flexible elastomer sections, 70d and 70d'. The engine mount 60d acts as a primary isolator for preventing vibration from the primary vibration source 36d from reaching the member 22d. Although, it should be understood, that the engine mount 60d is a passive isolating device, and by itself, can never completely isolate vibration. AVA 24d is comprised of a secondary spring 52d, primary mass 72d made up of casing mass 76d and supplemental mass 74d, and secondary mass and spring (not shown) which are contained within casing mass 76d and which move within independently thereof. This AVA 24d has two degrees-of-freedom (2DOF), in that it exhibits multiple resonances, fn1 and fn2. The AVA 24d acts to further isolate and reduce vibrations transmitted from the primary vibration source 36d that are not isolated by engine mount 60d. The multiple resonances, fn1 and fn2, can be preferably tuned, for example, near a fundamental disturbance frequency of the primary vibration source 36d and near a harmonic thereof. Therefore, the AVA 24d may be made more effective and efficient at those disturbance frequencies.

Figure 5:
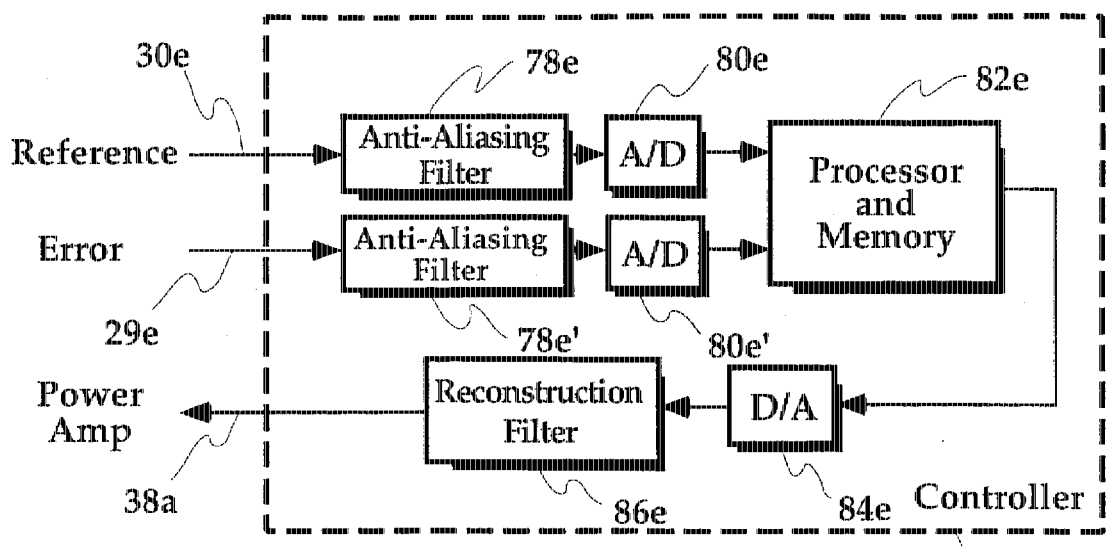
FIG. 5 is a block schematic diagram of the digital controller of the present invention.

FIG. 5 is a detailed block schematic view of the controller 39e used with the present invention apparatus/system and method. The electronic controller 39e, which is preferably digital, is comprised of anti-aliasing filters, 78e and 78e', which receive the reference signal from the reference sensor via reference cable 30e and receive the error signal from error sensor via error cable 29e, A/D converters, 80e and 80e', which convert the analog reference and error signals to useable digital signals, a digital processor and memory 82e for storing the appropriate input signals and processing them to calculate the updated output signal via the non-model base DFAA, a D/A converter 84e for converting the digital output from the processor and memory 82e to a useable analog signal, and a reconstruction filter 86e for providing the updated output signal to the power amp via output cable 38a.

Figure 6:
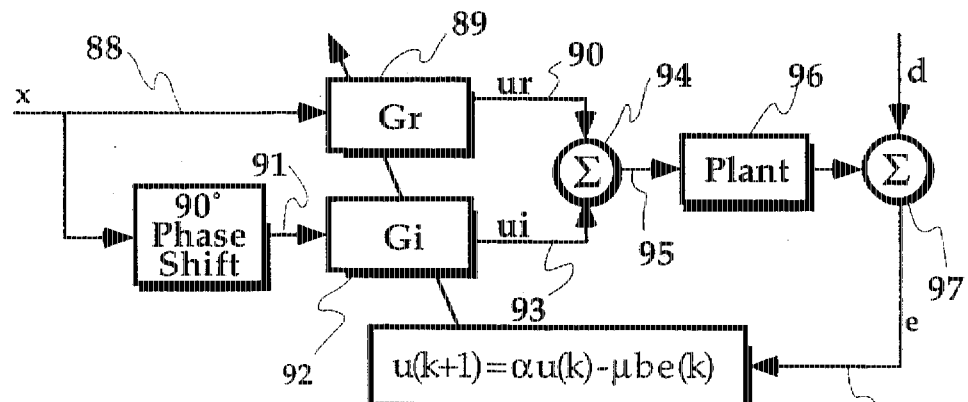
FIG. 6 is a block schematic diagram of the control method of the present invention for the tonal case.

FIG. 6 is a block model diagram illustrating a tonal implementation of the non-model based DFAA. In this tonal implementation, the reference signal x (preferably a pure sine wave) in line 88 is multiplied by a real gain Gr at 89 to derive the real output ur in line 90. Likewise the 90° phase-shifted signal (preferably a cosine wave) in line 91 is multiplied by imaginary gain Gi at 92 to derive the imaginary output ui in line 93. Then ui and ur are summed at junction 94 to derive the updated output signal, u, present at line 95. The updated output signal in line 95 is then input into the plant 96 to interact with the disturbance d which is vibration from the primary vibration source at junction 97. The residual vibration present after combining the updated output signal with the disturbance d is represented by error e in line 98. The error signal e is then used in the tonal-implementation update equation at block 99 to calculate the revised gains Gr and Gi to multiply by the real and imaginary inputs of x, 88 and 91, and derive the adaptation to the previous output signal. It should be noted that this is one of several possible implementations of the tonal algorithm. Other implementation techniques are outlined in U.S. Pat. No. 5,170,433 to Elliott et al.

Figure 7:
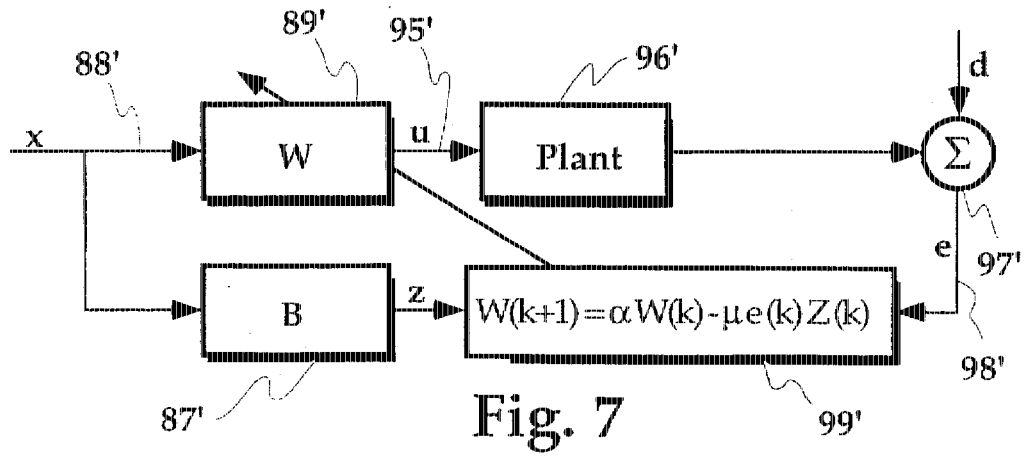
FIG. 7 is a block schematic diagram of the control method of the present invention for the broadband case.

FIG. 7 is a block model diagram illustrating the broadband implementation of the non-model based DFAA. In the broadband implementation, the reference signal x in line 88' is multiplied by weight coefficients in a preferable adaptive Finite Impulse Response (FIR) filter W (with m filter coefficients) at block 89' to derive the output signal u at line 95'. The output signal at line 95' is output to the plant 96' to interact with the broadband vibrational disturbance d from the primary vibration source at junction 97'. The residual vibration present after combination of the output signal with the disturbance d is represented by error e in line 98'. In the broadband case, the digital filter B at 87' receives inputs x and outputs z which are used in the update equation of block 99'. The filter B accounts for the choice of actuator and error sensor in the system.

Method/Algorithm

With reference to FIG. 1, and in another aspect, the present invention is a method of reducing dynamic vibration at an attachment point 26a on a dynamically vibrating member 22a, said dynamic vibration being generated at the attachment point 26a by a primary vibration source 36a, said method comprising the steps of:

a) attaching at least one actively-driven element, such as AVA 24a, to said attachment point 26a on said vibrating member 22a, b) providing an error signal from an error sensor 28a, such as accelerometer or the like, via error cable 29a to an electronic controller 39a, said error signal being indicative of residual dynamic vibration at a point substantially adjacent to said attachment point, and said error sensor 28a being substantially collocated at the attachment point, c) providing a reference signal, via reference cable 30a, from a reference sensor, such as tachometer 32a or accelerometer 34a, which is correlated to, or indicative of the frequency content present from, the primary vibration source (either broadband or tonal), d) calculating in the electronic controller 39a an updated output signal which is derived from said reference signal and said error signal based upon the non-model based Decentralized Feedforward Adaptive Algorithm (DFAA), and e) providing said updated output signal, via output cable 38a, to the power amp 58a to dynamically and actively drive said at least one actively-driven element, thereby causing dynamic forces at the attachment point 26a and thereby causing residual dynamic vibration at the attachment point 26a on said vibrating member 22a to be reduced. Notably, it should be understood that the vibration reduction can be accomplished in one selected from a group consisting of a broadband fashion and a tonal fashion.

Tonal Case

In the tonal case, the non-model based DFAA is implemented in an active vibration control system including an actively-driven element, an error sensor, and a reference sensor. The control method for reducing dynamic vibration at the attachment point on a vibrating member comprises the steps of:

a) obtaining $\alpha$ which is a positive real scalar similar to the n "leak" parameter of the "leaky" LMS algorithm as discussed in "Adaptive Signal Processing" by B. Widrow and S. D. Stearns, 1985, which affects convergence and the steady state solution of the algorithm/method, b) obtaining u(k) which is a complex quantity (including real and imaginary components) representative of the magnitude and phase of the output signal to said actively-driven element at the operating frequency (fo) and at a $k^{th}$ iteration, c) obtaining $\mu$ which represents a positive real convergence factor which controls a convergence speed of said control method, d) obtaining b which represents a complex constant whose value is dependent upon characteristics of said driven element and said error sensor in said active vibration control system, e) obtaining e(k) which is a complex quantity representative of magnitude and phase of said error signal from the collocated error sensor which measures residual vibration at said attachment point substantially collocated with said actively-driven element at the operating frequency (fo) at the $k^{th}$ iteration, f) calculating an updated output signal u(k+1) which is a complex quantity representative of magnitude and phase of said updated output signal at the operating frequency (fo) at the $(k+1)^{th}$ iteration according to a non-model based Decentralized Feedforward Adaptive Algorithm (DFAA) update equation:

$$u(k+1)=\alpha\, u(k)-\mu\, b\, e(k) \quad (2)\ \text{(Tonal)}$$

and g) providing said updated output signal u(k+1) to said actively-driven element to dynamically drive same to produce dynamic forces and reduce the dynamic vibration at the attachment point, in a tonal fashion, at the operating frequency (fo).

Equation 2 above represents a means for obtaining an updated output signal u(k+1) from $\alpha$, u(k), $\mu$, b, and e(k). This equation was constructed by the inventors after studying the convergence and stability characteristics of real time gradient-based descent algorithms, such as the filtered-x LMS algorithm. It has been shown by the inventors that this update equation will be stable for all frequencies for which the actively driven element (AVA) and error sensor are substantially collocated on the vibrating member (within about a ¼ wavelength of the structural vibration) provided the parameters $\alpha$, $\mu$ and b are judiciously chosen as discussed below.

The parameters $\alpha$ and $\mu$ control the convergence of the tonal DFAA (Equation 2). $\alpha$ represents a positive real scalar which varies between 0 and 1 and is similar to the "leak" parameter of the "Leaky LMS algorithm, as discussed in Adaptive Signal Processing by B. Widrow and S. D. Stearns, 1985. This parameter controls the magnitude of the output signal and, thus, affects convergence and stability. When $\alpha$ is set to 1, the output signal is allowed to increase freely until vibration is nullified or the output signal reaches some preset limit determined by the system designer based on constraints of the active element 24a, power amplifier 58a, or other system considerations. A value of less than 1 will reduce the output signal and consequently reduce the possibility of instability. Typically, $\alpha$ has a value of about 0.999. The convergence factor $\mu$ is a positive real scalar which controls the convergence speed of the DFAA. It is typically chosen based upon system requirements to be approximately 1/10 to 1/100 of the stability limit. This is determined experimentally by incrementally increasing the step size until system instability is encountered. The parameters $\alpha$ and $\mu$ are typically constants, but may be adapted in time to optimize the performance of the system.

The construction of the DFAA (Equation 2) by the inventors was incumbent on the inventors' observation that if a scalar, b, can be found such that all of the eigenvalues of the complex transfer function matrix, $\hat{C}$, multiplied by the scalar b (i.e. the eigenvalues of $b\hat{C}$) have positive real parts, then the matrix $\hat{C}^H$ can be replaced by the scalar b in the filtered-x LMS algorithm, and the resulting algorithm, the DFAA (Equation 2), will be stable. Further, the inventors recognized that if actuators and sensors are substantially collocated on a structure, then the eigenvalues of the resulting complex transfer function matrix $\hat{C}$ will all lie in one half of the complex plane. Further, the part of the complex plane where the eigenvalues lie, is dependent only upon the nature of the actuators and sensors, and does not depend on the structure itself. For example, if the error sensor measures velocity and the output signal corresponds to a force, then the eigenvalues will all have positive real parts. b can then be chosen to be 1 such that $b\hat{C}$ has eigenvalues with positive real parts. The DFAA will then be guaranteed to be stable for sufficiently small $\mu$ as discussed above. In another case, the error sensors may measure acceleration and all of the eigenvalues of $\hat{C}$ will then have positive imaginary parts. b can then be chosen as follows:

$$b=-j$$

where $j=\sqrt{-1}$. This will result in $b\hat{C}$ having eigenvalues with positive real parts ensuring the stability of the non-model based DFAA of the present invention. For a further example, the error sensors may measure displacement, in which case, the eigenvalues of $\hat{C}$ will have negative imaginary parts, and b must then be chosen as follows:

$$b=j.$$

Further, b can be chosen to account for dynamics elsewhere in the actuators or sensors. For example, b can be chosen to account for a phase shift caused by the power amplifier. In another case, b can be chosen to account for dynamics between the output signal, u, and the force generated by the actuator as in the case of an actuator resonance. It should be noted, however, that b is not a function of the dynamics of the vibrating structure, since the half of the complex plane occupied by the eigenvalue of $\hat{C}$ when the actuator and sensors are collocated is dependent only upon the actuators and sensors themselves.

It should be noted that replacing $\hat{C}$ by b as in the non-model based DFAA, the algorithm is simplified in two significant ways. First, b is a scalar, and thus the resulting algorithm (the DFAA) is decoupled in that the output signals are dependent only upon the collocated error sensor (and not on other error sensors or output signals). Second, since b is not a function of the structural dynamics, i.e., the DFAA is non-model based. That is, b can be chosen based only upon the actuators and sensors, and the DFAA requires no information about the structure. The inventors realize that this simplification will result in slower convergence as compared to the filtered-x LMS algorithm. The degree by which convergence is slowed, is thought to be dependent on the amount of system damping present. If damping is low, it is thought convergence will be somewhat slower. If damping is high, then the non-model based DFAA will behave similarly to the filtered-x LMS algorithm. In general, the damping will generally be sufficiently high that the slower convergence time will not be a factor in system design and will be offset by the dramatically reduced controller complexity.

Broadband Case

In the broadband case, the non-model based DFAA is also implemented in an active vibration control system including an actively-driven element, an error sensor, and a reference sensor. The broadband control method for reducing dynamic vibration at the attachment point on a member, comprises the steps of:

a) obtaining $\alpha$ which is a positive real scalar which affects convergence and steady state solution as in the tonal DFAA, b) obtaining W(k) which is a vector of values of m filter coefficients for an adaptive preferably FIR filter whose input is comprised of a reference signal which is correlated to a primary vibration source, and whose output comprises an output signal to said actively-driven element at a $k^{th}$ time sample, c) obtaining μ which represents a positive real scalar convergence factor which controls a convergence speed of said control method, d) obtaining e(k) which is representative of the error signal which measures said dynamic vibration at said attachment point at a point substantially collocated with said actively-driven element at an operating frequency at said $k^{th}$ time sample, e) obtaining Z(k) which is a vector and represents the last m time samples of the output signal of a filter, B, whose input is said reference signal which is correlated to said primary vibration source and whose design parameters are dependent upon characteristics of said actively-driven element and said error signal, f) calculating according to a non-model based Decentralized Feedforward Adaptive Algorithm (DFAA), W(k+1) which is an updated vector of values of filter coefficients for said adaptive filter whose input is comprised of a reference signal which is correlated to said primary vibration source, and whose output comprises an updated output signal to said actively-driven element at a $(k+1)^{th}$ iteration according to the non-model based broadband DFAA update equation:

$$W(k+1) = \alpha \; W(k) - \mu \; e(k) \; Z(k), \quad \text{(3) (Broadband)}$$

g) calculating u(k) which is the output of the feedforward FIR filter W(k) for time sample k, and which is the output signal to said actively-driven element, and h) driving said actively-driven element according to said output signal u(k) to reduce dynamic vibration at said attachment point within a particular frequency range of said primary vibration source at time sample k.

In order to show the benefit of the broadband DFAA, it is necessary to introduce the fully coupled broadband Filtered-x LMS algorithm for comparison:

Equation 4(Broadband Filtered-x LMS)
$$W_{i,k+1} = W_{i,k} + 2\mu \sum_{j=1}^{n} e_{j,k} R_{i,j,k}$$

$W_{i,k}$ is the vector of m coefficients for the feedforward FIR filter for the $i^{th}$ actuator at the $k^{th}$ sample. $e_{j,k}$ is the signal of the $j^{th}$ sensor at the $k^{th}$ sample. $e_{j,k}$ is an actual time signal as opposed to the real and imaginary parts of a tonal signal as previously discussed in the tonal LMS case. $R_{i,j,k}$ is a vector of the last m samples of the reference signal as filtered by the plant model corresponding to the path between the $i^{th}$ actuator and $j^{th}$ sensor.

Note that the broadband filtered-x LMS differs from the broadband DFAA in two ways. Firstly, there is no summation in the DFAA as in the second term of the left side of Equation 4. This summation accounts for contributions to the update equation from all sensors. Thus, the broadband filtered-x LMS is centralized in that each actuator signal is adapted with information from all sensors. The broadband non-model based DFAA is decentralized in that each actuator signal is adapted only with information from its collocated error signal. Secondly, the vector $R_{i,j,k}$ is the output of what is commonly called the X-filter which is a model corresponding to the dynamics of the path between the $i^{th}$ actuator and $j^{th}$ sensor including the dynamics of the vibrating structure. In the broadband DFAA, this filter is replaced by the B filter, 87', which is constructed based only upon the choice of actuator and sensor and does not include dynamics of the vibrating structure.

The B filter is analogous to the scalar b for the tonal algorithm. It accounts for the choice and dynamics of the actuators and sensors. For example, for the tonal DFFA, b=−j when acceleration is measured by the error sensors which corresponds to a 90 degree phase lag. In the broadband case, the filter B would need to be constructed to produce a 90 degree phase lag throughout the operating frequency range. As in the tonal case, B could be designed to account for dynamics elsewhere in the system as in the power amplifiers or the actuators. It should again be stressed, however, that the filter B is independent of the dynamics of the vibrating structure.

The dynamics of broadband algorithms are, in general, more difficult to analyze than in tonal algorithms. However, a few points regarding stability are of interest. If the tonal non-model based DFAA is stable over the entire frequency range, that is, the matrix $C(\omega)$ is positive real for all $\omega$, then, the decentralized broadband algorithm will be stable as well. Assuming this to be true, it may be said that instability is of greater risk in the broadband case since in the tonal case $bC(\omega)$ must be positive real only at the disturbance frequency, while in the broadband case $bC(\omega)$ must be real for all w in the frequency band of interest. If we have actively-driven elements and sensors that are exactly collocated and have no dynamics therebetween, then $bC(\omega)$ will be positive real for all $\omega$ and the algorithm will be stable. However, in practice, perfect collocation is often difficult, and the actuators and sensors will have some dynamics such that at some frequency $bC(\omega)$ will have eigenvalues with negative real parts. Therefore, in the broadband case, the algorithm for certain placements, may be unstable. Therefore, it should be understood that it is important to precisely collocate the actively-driven element and the error sensor in the broadband case and to account for the necessary actuator and sensor dynamics in the filter B.

While several embodiments, including a preferred embodiment, of the present invention have been described in detail, various modifications, alterations, changes, and adaptations to the aforementioned may be made without departing from the spirit and scope of the present invention as defined in the appended claims. It is intended that all such modifications, alterations, and changes be considered part of the present invention.

What is claimed is:

1. An active vibration control system for attachment to, and controlling dynamic vibration of, a vibrating member, said dynamic vibration being caused by a primary vibration source, comprising:

(a) at least one actively-driven element for attachment to said vibrating member at an attachment point;

(b) a collocated error sensor for providing an error signal indicative of residual dynamic vibration at a point substantially adjacent to said attachment point on said vibrating member;

(c) a reference sensor for providing a reference signal which is correlated to a frequency content of, said primary vibration source; and (d) an electronic controller for adaptively calculating an updated output signal which is derived from said reference signal and said error signal based upon a non-model based Decentralized Feedforward Adaptive Algorithm (DFAA) and providing said updated output signal to said at least one actively-driven element thereby causing said residual dynamic vibration at said attachment point to be reduced in one selected from a group consisting of a broadband and tonal fashion.

2. A system of claim 1 wherein said at least one actively-driven element is at least one Active Vibration Absorber (AVA) including;

(i) an inertial tuning mass, (ii) a flexible element for interconnecting said inertial tuning mass to said vibrating member at an attachment point on said vibrating member, and (iii) means for actively driving said inertial tuning mass to create a dynamic force acting at said attachment point on said vibrating member.

3. A system of claim 2 wherein said means for actively driving said inertial tuning mass is a voice coil actuator, said collocated error sensor is an accelerometer, and said reference sensor is one selected from a group consisting of a tachometer and an accelerometer.

4. A system of claim 2 wherein said at least one Active Vibration Absorber (AVA) attaches to said vibrating member which is an inner member of an engine mount.

5. A system of claim 1 wherein said non-model based Decentralized Feedforward Adaptive Algorithm (DFAA) is tonal and provides said updated output signal $u(k+1)$ according to an equation:

$$u(k+1) = \alpha\, u(k) - \mu\, b\, e(k)$$

where $\alpha$ is a positive real scalar which affects convergence and steady state solution, $u(k)$ is a complex quantity representative of an output signal to said at least one actively driven element at an operating frequency (fo) at a $k^{th}$ iteration, $\mu$ is a positive real convergence factor which controls convergence speed, b is a complex constant whose value is dependent upon characteristics of said at least one actively-driven element and said error sensor, and $e(k)$ is a complex quantity representative of a magnitude and phase of said error signal at an operating frequency (fo) at a $k^{th}$ iteration.

6. A system of claim 1 wherein said non-model based Decentralized Feedforward Adaptive Algorithm (DFAA) is broadband and provides said updated output signal based upon a vector of updated weight coefficients $W(k+1)$ according to an equation:

$$W(k+1) = \alpha\, W(k) - \mu\, e(k)\, Z(k)$$

where $\alpha$ is a positive real scalar which affects convergence and steady state solution, $W(k)$ is a vector of values of filter coefficients for an adaptive filter whose output comprises an output signal to said at least one actively-driven element at a $k^{th}$ time sample, $\mu$ is a positive real convergence factor which controls convergence speed, $e(k)$ is a complex quantity representative of a magnitude and phase of said error signal at said $k^{th}$ time sample, and $Z(k)$ is a vector of values derived by passing said reference signal through a B filter dependent upon characteristics of said at least one actively-driven element and said error sensor but independent of system dynamics.

7. A method of reducing dynamic vibration at an attachment point on a vibrating member, said dynamic vibration being generated at said attachment point by a primary vibration source, comprising:

(a) attaching at least one actively-driven element to said attachment point on said vibrating member;

(b) providing an error signal indicative of residual dynamic vibration at a point substantially adjacent to said attachment point from an error sensor which is substantially collocated at said attachment point;

(c) providing a reference signal from a reference sensor which is correlated to a frequency of said primary vibration source;

(d) calculating in an electronic controller an updated output signal which is derived from said reference signal and said error signal based upon a non-model based Decentralized Feedforward Adaptive Algorithm (DFAA); and (e) providing said updated output signal to actively drive said at least one actively-driven element and thereby produce dynamic forces which cause said residual dynamic vibration at said attachment point on said vibrating member to be reduced in one selected from a group consisting of a broadband and a tonal fashion.

8. A method of claim 7 wherein said non-model based Decentralized Feedforward Adaptive Algorithm (DFAA) provides tonal control and provides said updated output signal $u(k+1)$ according to an equation:

$$u(k+1) = \alpha\, u(k) - \mu\, b\, e(k)$$

where $\alpha$ is a positive real scalar which affects convergence and steady state solution, $u(k)$ is a complex quantity representative of an output signal to said at least one actively driven element at an operating frequency (fo) at a $k^{th}$ iteration, $\mu$ is a positive real convergence factor which controls convergence speed, b is a complex constant whose value is dependent upon characteristics of said at least one actively-driven element and said error sensor, and $e(k)$ is a complex quantity representative of a magnitude and phase of said error signal at an operating frequency (fo) at a $k^{th}$ iteration.

9. A method of claim 7 wherein said non-model based Decentralized Feedforward Adaptive Algorithm (DFAA) is broadband and provides broadband control and provides said updated output signal based upon a vector of updated weight coefficients $W(k+1)$ according to an equation:

$$W(k+1) = \alpha\, W(k) - \mu\, e(k)\, Z(k)$$

where $\alpha$ is a positive real scalar which affects convergence and steady state solution, $W(k)$ is a vector of values of filter coefficients for an adaptive filter whose output comprises an output signal to said at least one actively-driven element at a $k^{th}$ time sample, $\mu$ is a positive real convergence factor which controls convergence speed, $e(k)$ is a complex quantity representative of a magnitude and phase of said error signal at said $k^{th}$ time sample, and $Z(k)$ is a vector of values derived by passing said reference signal through a B filter dependent upon characteristics of said at least one actively-driven element and said error sensor but independent of system dynamics.

10. A method of claim 7 wherein said at least one actively-driven element is at least one Active Vibration Absorber (AVA) including:

(i) an inertial tuning mass, (ii) a flexible element for interconnecting said inertial tuning mass to said vibrating member at an attachment point on said vibrating member, and (iii) means for actively driving said inertial tuning mass and creating a dynamic force acting at said attachment point on said vibrating member.

11. A method of claim 10 wherein said means for actively driving said inertial tuning mass is a voice coil actuator, said error sensor is an accelerometer, and said reference sensor is one selected from a group consisting of a tachometer and an accelerometer.

12. A method of claim 10 wherein said at least one Active Vibration Absorber (AVA) attaches to said vibrating member which is an inner member of an engine mount.

13. In an active vibration control system including an actively-driven element, an error sensor, and a reference sensor, a control method for reducing dynamic vibration at an attachment point of a vibrating member, comprising the steps of:
   (a) obtaining $\alpha$ which is a positive real scalar between 0 and 1 which affects convergence and steady state solution;
   (b) obtaining u(k) which is a complex quantity representative of magnitude and phase of an output signal to said actively-driven element at an operating frequency (fo) at a $k^{th}$ iteration;
   (c) obtaining $\mu$ which represents a positive real convergence factor which controls a convergence speed of said control method;
   (d) obtaining b which represents a complex constant whose value is dependent upon characteristics of said driven element and said error sensor in said active vibration control system;
   (e) obtaining e(k) which is a complex value representative of magnitude and phase of said error sensor which measures residual vibration at said attachment point substantially collocated with said actively-driven element at said operating frequency (fo) at said $k^{th}$ iteration;
   (f) calculating according to a non-model based Decentralized Feedforward Adaptive Algorithm (DFAA), an updated output signal u(k+1) which is a complex quantity representative of magnitude and phase of said updated output signal at said operating frequency (fo) at a $(k+1)^{th}$ iteration according to an equation $u(k+1)=\alpha u(k)-\mu b e(k)$; and
   (g) providing said updated output signal to said actively-driven element to drive said actively-driven element and produce active forces which reduce said dynamic vibration at said attachment point in a tonal fashion at said operating frequency (fo).

14. A control method of claim 13 wherein said actively-driven element is at least one Active Vibration Absorber (AVA) including:
   (i) an inertial tuning mass,
   (ii) a flexible element for interconnecting said inertial tuning mass to said vibrating member at an attachment point on said vibrating member, and
   (iii) means for actively driving said inertial tuning mass and creating a dynamic force acting at said attachment point on said vibrating member.

15. A control method of claim 14 wherein said means for actively driving said inertial tuning mass is a voice coil actuator, said error sensor is an accelerometer, and said reference sensor is one selected from a group consisting of a tachometer and an accelerometer.

16. A control method of claim 14 wherein at least one Active Vibration Absorber (AVA) attaches to said vibrating member which is an inner member of an engine mount.

17. In an active vibration control system including an actively-driven element, an error sensor, and a reference sensor, a control method for reducing dynamic vibration at an attachment point on a member, comprising the steps of:
   (a) obtaining $\alpha$ which is a positive real scalar which affects convergence and steady state solution;
   (b) obtaining W(k) which is a vector of values of filter coefficients for an adaptive filter whose input is comprised of a reference signal which is correlated to a primary vibration source, and whose output comprises an output signal to said actively-driven element at a $k^{th}$ time sample;
   (c) obtaining $\mu$ which represents a positive real scalar convergence factor which controls a convergence speed of said control method;
   (d) obtaining e(k) which is an error signal from said error sensor which measures said dynamic vibration at said attachment point at a point substantially collocated with said actively-driven element at said $k^{th}$ time sample;
   (e) obtaining Z(k) which is a vector quantity and represents an output signal from a filter whose input is said reference signal which is correlated to said primary vibration source and said filter has design parameters which are dependent upon characteristics of said actively-driven element and said error signal;
   (f) calculating according to a non-model based Decentralized Feedforward Adaptive Algorithm (DFAA), W(k+1) which is an updated vector of values of filter coefficients for said adaptive filter whose input is comprised of a reference signal which is correlated to said primary vibration source, and whose output comprises an updated output signal to said actively-driven element at a $(k+1)^{th}$ time sample according to an equation $W(k+1)=\alpha W(k)-\mu e(k) Z(k)$; and
   (g) driving said actively-driven element according to said updated output signal to produce dynamic forces and reduce dynamic vibration at said attachment point within a particular broadband frequency range of said primary vibration source.

18. A control method of claim 17 wherein said actively-driven element is at least one Active Vibration Absorber (AVA) including:
   (i) an inertial tuning mass,
   (ii) a flexible element for interconnecting said inertial tuning mass to said vibrating member at an attachment point on said vibrating member, and
   (iii) means for actively driving said inertial tuning mass and creating a dynamic force acting at said attachment point on said vibrating member.

19. A control method of claim 18 wherein said means for actively driving said inertial tuning mass is a voice coil actuator, said error sensor is an accelerometer, and said reference sensor is one selected from a group consisting of a tachometer and an accelerometer.

20. A control method of claim 18 wherein said at least one Active Vibration Absorber (AVA) attaches to said vibrating member which is an inner member of an engine mount.

* * * * *